United States Patent
Dettinger et al.

(10) Patent No.: US 6,199,069 B1
(45) Date of Patent: Mar. 6, 2001

(54) SYSTEM AND METHOD FOR SWITCHING BETWEEN DATABASES WITHOUT DISRUPTION TO APPLICATIONS

(75) Inventors: Barbara Michelle Dettinger; Richard Michael Smith, both of Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 08/918,038

(22) Filed: Aug. 25, 1997

(51) Int. Cl.[7] .................................................. G06F 17/30
(52) U.S. Cl. ............................................................. 707/202
(58) Field of Search ...................................... 707/202, 204

(56) References Cited

U.S. PATENT DOCUMENTS 5,537,642 * 7/1996 Glowny et al. ...................... 713/200

OTHER PUBLICATIONS

Azagury, A et al. "Highly Available Cluster: A Case Study" FTCS–24 Digest of Pappers, pp. 404–413, Jun. 1994.*
Ron–Chung Hu. et al. "Navigation Server: A Highly Parallel DBMS on Open Systems" Proc. of the 11th Internat. Conf. on Data Enginering, pp. 184–185, Mar. 1995.*
Kam–Fai Wong, "Performance Evaluation of Three Logging Schemes for a Shared–Nothing database Server" Proc. of the 15th Internat. Conf. on Distributed Computing Systems, pp. 221–228, Jun. 1995.*

* cited by examiner

*Primary Examiner*—Jack Choules
(74) *Attorney, Agent, or Firm*—S. Jared Pitts (57) ABSTRACT

According to the present invention, a system and method for switching between databases in the event of a database failure is provided. The preferred system and method provide for database switching without requiring the computer system to be taken down and then restarted. The preferred system and method uses a database switcher on each application server and a failure detector on each database. When the failure detector determines that a problem has arisen in a primary database it sends a signal to the database switcher on the application server. The database switcher contains a list of jobs that are to be notified of a database switch, as well as the system name of the primary and backup databases. The database switcher then sets flags on each of the jobs in the notify list. When these jobs next perform a function that requires database access, the flag informs the jobs that a database switch must first be made. That switch can then be accomplished, and the jobs continued. Thus, the present invention provides a system and method for switching between a primary and a backup database that can be done without shutting down the entire computer system.

40 Claims, 6 Drawing Sheets

SYSTEM AND METHOD FOR SWITCHING BETWEEN DATABASES WITHOUT DISRUPTION TO APPLICATIONS

BACKGROUND OF THE INVENTION

1. Technical Field

The present invention relates in general to databases in computer systems. More specifically, the present invention relates to the field of automatic switching between databases in a computer system.

2. Background Art

The development of the EDVAC computer system of 1948 is often cited as the beginning of the computer era. Since that time, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

As the sophistication of computer systems has grown, the tasks they are assigned to perform have grown in complexity and importance. Large sophisticated computer systems today run the most important aspects of most businesses. For example, computer systems today are used to track sales, expenses, inventory, receipts and cash flow of most retail establishments. Likewise, computer systems run the reservation, ticketing and scheduling of most airlines. Because of the critical nature of their function, the dependability of these types of computer systems is extremely important. If such a computer system is inoperable, even for a short time, serious problems and large costs can result.

Various techniques are used to improving the reliability of these computer systems. One technique involves the use of a specialized database computer that stores all the critical data needed by the computer system. For example, this database could include all the inventory, sales records, employee records, and cash flow records of a retail establishment. Processes running in the computer system access the data on the specialized database to perform their assigned function. Because any failure in the specialized database results in all processes on the computer system stopping, the specialized database computer is typically designed to be as reliable as possible. Additionally, a backup database is commonly used to even further increase system reliability. The backup database is typically a mirror replication of the original database. When the original database fails, the backup is used in its place. Unfortunately, switching the processes in the computer system from the original database to the backup database typically requires that they be stopped and manually restarted with the backup database selected.

Stopping and restarting all the processes on a complex business computer system can be extremely time consuming. This can result in significant down time. Additionally, processes may have to redo significant amounts of work that was lost when the original database goes down. An additional problem occurs when the users of the computer system are themselves unable to stop and restart the jobs. This can occur when the computer system actually running the processes is in a remote location from the users.

Without a system and method to automatically switch from a current database to a backup database without manually restarting the affected jobs, companies that rely on critical database systems will continue to suffer excessive costs and downtime when a database failure occurs.

DISCLOSURE OF INVENTION

According to the present invention, a system and method for switching between databases in the event of a database failure is provided. The preferred system and method provide for database switching without requiring the computer system to be taken down and then restarted. The preferred system and method uses a database switcher on each application server and a failure detector on each database. When the failure detector determines that a problem has arisen in a primary database it sends a signal to the database switcher on the application server. The database switcher contains a list of jobs that are to be notified of a database switch, as well as the system name of the primary and backup databases. The database switcher then sets flags on each of the jobs in the notify list. When these jobs next perform a function that requires database access, the flag informs the jobs that a database switch must first be made. That switch can then be accomplished, and the jobs continued. Thus, the present invention provides a system and method for switching between a primary and a backup database that can be done without shutting down the entire computer system.

DESCRIPTION OF THE PREFERRED EMBODIMENTS

A system and method for providing switching between databases in the event of a database failure is provided. The preferred system and method provide for database switching without requiring the computer system to be taken down and then restarted. The preferred system and method uses a database switcher on each application server and a failure detector on each database. The system and method is preferably implemented on a three-tier client server architecture, such as an R/3 system provided by SAP AG. For those unfamiliar with three-tiered client server systems and R/3, an overview will now be provided.

Overview—SAP AG's R/3

SAP AG's R/3 is a suite of client/server data processing applications based on the concept of combining all the business activities and processes of a company into a single, integrated software solution. R/3 uses real-time integration to link a company's business processes and applications and supports immediate responses to change throughout an organization, whether on a departmental, divisional or global scale.

R/3 applications cover a wide variety of areas, including financials, asset management, controlling, sales and distribution, project planning, manufacturing, production planning, quality assurance, human resources and others.

R/3 is implemented in a three-tier configuration, meaning that separate computers can be used as clients, application servers and databases. Clients serve as the end user interface to the R/3 system. From the clients, the end user reads and interacts with the application, or changes and creates new data. A typical R/3 implementation has a plurality of client machines, with a large installation having in excess of a thousand client machines. Client machines can be IBM compatible personal computers (PC's) running operating systems such as OS/2 or Windows. Additionally, Network Computers (NC's) or Macintosh computers can be used as client machines.

Application servers are used to process R/3 system transactions. Each application server typically runs a plurality of processes called "jobs" as requested by the clients. The application servers run the jobs, either using data from local memory or initiating databases requests. In typical R/3 systems, multiple application servers are used to provide different functions, or they can be defined to logically group users, such as by department or geography. In a large installation a large number of application servers are set up to work in parallel with each other, with individual application servers optimized for overall performance. Additionally, some specialized application servers can be defined for certain areas, such as sales and distribution, financial accounting, etc.

Typically, application servers are implemented on high performance server machines, such as IBM's AS/400 running OS/400, IBM's RS/6000 running AIX, and other UNIX server machines. These types of machines are able to perform a high rate of transactions while maintaining a high level of reliability.

The third layer of the three-tiered R/3 system is the database server. Most installations use one database server, but large installations can use multiple database servers. As stated previously, during operation the application servers access data stored in the database servers. The database servers are typically high performance systems designed to facilitate a large number of transactions.

Because a failure in the database can effect a large number of processing jobs, the reliability of the database server is of utmost importance. Thus, systems such as IBM's AS/400 using advanced relational database programs such as DB2 for OS/400 are typically used as database servers. Other such systems include mainframe computers such as IBM's S/390 using DB2/MVS and various UNIX systems. Additionally, backup database systems are also used to improve the reliability of the overall systems. To implement this, software such as lake View Technology's Mimix 400 or Vision Solution's OMS/400 is used to mirror the primary database server on a backup database server. When a failure then occurs on the primary database server, the R/3 is taken down, and then brought back up with the backup database defined as the new primary database.

This greatly improves the reliability of the R/3 system in the sense that database failures can be remedied and the system brought back up relatively quickly. However, because the R/3 must be taken down and reconnected to the new database, all jobs that are running on the application server must be stopped and restarted. This boots all the clients that are currently working off the application server and requires that they be reconnected to the system. Additionally, this operation typically requires intervention at the application server level to change the configuration of the application server to manually specify the backup system as the new database server. Often the end user at a client machine does not have access to the application server to allow this action to be performed, and thus must wait for others to set up the new system before they can restart their jobs. Both of these situations can be a problem where the reliability of the system is of upmost importance.

This type of problem exists with other types of computer systems that use database servers to provide data and backup database servers to provide reliability. Thus, for many types of mission critical applications the reliability of a complex three tiered systems such as R/3 cannot be properly maintained using current systems. The remainder of this specification discloses a system and method for automatically switching between databases when a database failure occurs.

DETAILED DESCRIPTION

Figure 1:
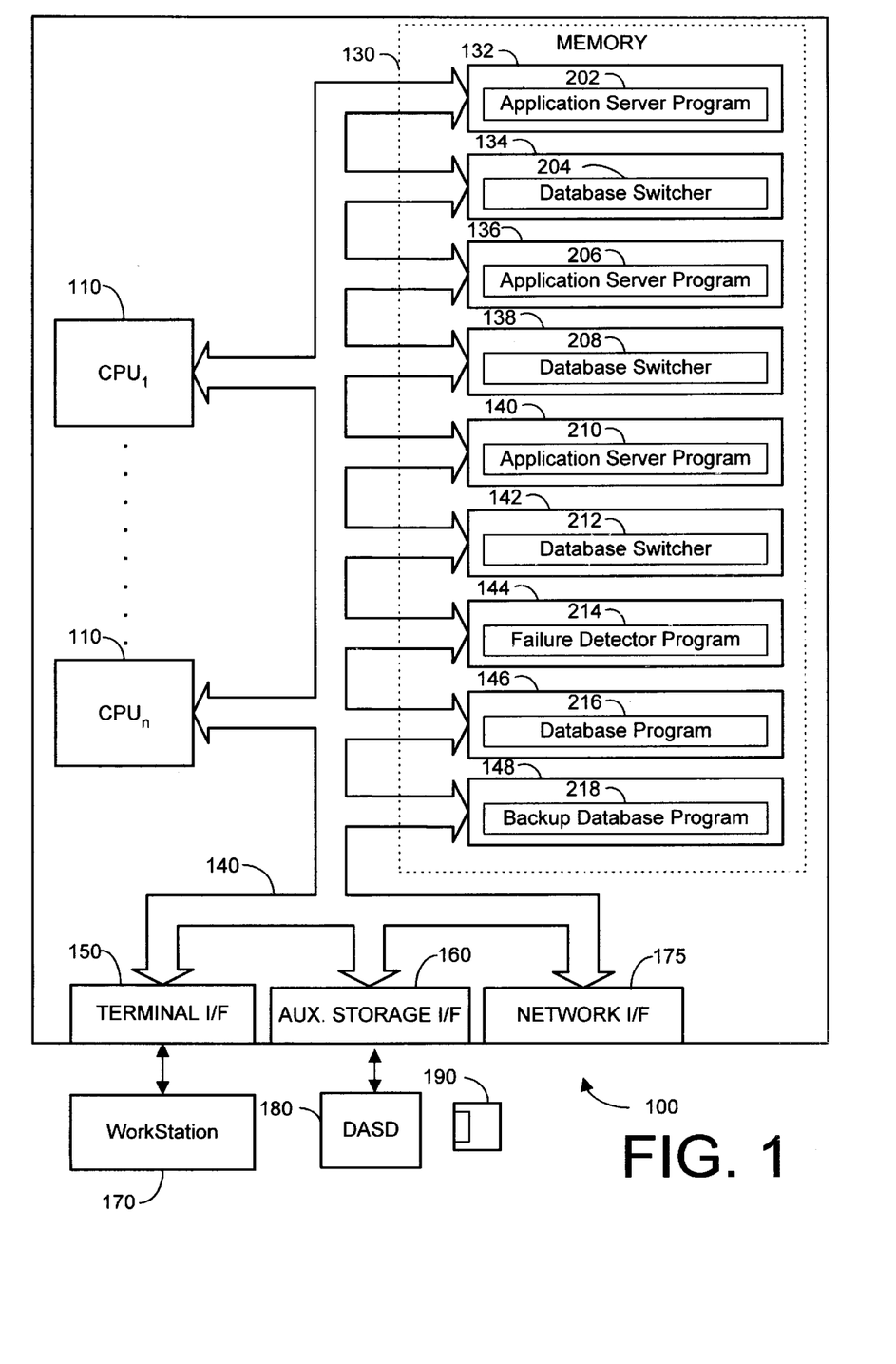
FIG. 1 is a schematic view of a client/server computer system with hot database switching in accordance with the preferred embodiment.

Referring now to FIG. 1, a computer system 100 in accordance with a preferred embodiment of the present invention includes: a plurality of Central Processing Units (commonly referred to as processors or CPUs) 110: a terminal interface 150; an auxiliary storage interface 160; a workstation 170; a Direct Access Storage Device (DASD) 180; a bus 140; and a memory 130 which includes multiple locations for containing various software programs. In this example, memory 130 includes an Application Server 202 running in location 132, a Database Switcher 1 204 running in location 134, an Application Server 206 running in location 136, a Database Switcher 208 running in location 138, an Application Server 210 running in location 140, a Database Switcher 212 running in location 142, a Failure Detector 214 running in location 144, a primary database 216 running in location 146, and a backup database 218 running in location 148.

CPUs 110 perform computation and control functions of system 100. All CPUs associated with system 100 may each individually comprise a single integrated circuit, such as a microprocessor, or may comprise any suitable number of integrated circuit devices and/or circuit boards working in cooperation to accomplish the functions of a central processing unit. All CPUs are capable of suitably executing the programs contained within memory 130 and acting in response to those programs or other activities that may occur in system 100.

Memory 130 is any type of memory known to those skilled in the art. This would include Dynamic Random Access Memory (DRAM), Static RAM (SRAM), flash memory, cache memory, etc. While not explicitly shown in FIG. 1, memory 130 may be a single type of memory component or may be composed of many different types of memory components. For example, memory 130 and CPUs 110 may be distributed across several different computers that collectively comprise system 100. Additionally, the term "memory" as used herein is defined to include the virtual address space of all CPU's. For example, Application Server 202 and Database Switcher 204 may reside on one computer with $CPU_1$, Application Server 206 and Database Switcher 208 may reside on another computer with $CPU_2$, Application Server 210 and Database Switcher 212 may reside on another computer with $CPU_3$, primary database program 216 and failure detector 214 may reside on another computer with $CPU_{n-1}$, and backup database program 218 on another computer system with a separate $CPU_n$. Computer system 100 of FIG. 1 simply illustrates many of the salient features of the invention, without limitation regarding the physical location of CPUs 110 or memory locations within memory 130.

Connection bus 140 serves to transmit programs, data, status and other forms of information or signals between the various components of system 100. The preferred embodiment for bus 140 is any suitable physical or logical means of connecting computer systems and components known to those skilled in the art. This includes, but is not limited to, direct hard-wired connections, fiber optics, infrared (IR) and other forms of wireless connections. It is anticipated that many alternative methods and materials for connecting computer systems and components will be readily adapted for use with the present invention. This would include those methods and materials not presently known but developed in the future.

Terminal interface 150 allows human users to communicate with system 100, normally through a workstation 170. Workstation 170 can be any type of computer system, such as an IBM PS/2 personal computer, RS/6000 or an AS/400 computer. Although system 100 as depicted in FIG. 1 contains only a single workstation 170, it should be understood that the actual number of workstations attached to system 100 will be a function of system design and user preference, and will typically comprise multiple workstations. Workstation 170 may also be a dumb terminal or other non-programmable computer input/output device which allows human interaction with computer system 100. Auxiliary storage interface 160 represents any method of interfacing a storage apparatus to a computer system known to those skilled in the art. Auxiliary storage interface 160 allows auxiliary storage devices such as DASD 180 to be attached to and communicate with the other components of system 100. While only one auxiliary storage interface 160 is shown, the present invention anticipates multiple interfaces and multiple auxiliary storage devices such as DASD 180. For example, DASD 180 may be a floppy disk drive which is capable of reading and writing programs or data on a floppy disk 190. DASD 180 may also be any other type of DASD known to those skilled in the art. This would include CD-ROM drives, hard disk drives, optical drives, etc.

Network interface 175 is used to connect other computer systems and/or workstations to computer system 100 in networked fashion. The network interface 175 can provide a connection to any networked environment, such as the Internet and the World-Wide-Web, or internal web-based systems (typically called Intranets). The present invention applies equally no matter how computer system 100 may be connected to other computer systems and/or workstations, regardless of whether the connection is made using present-day analog and/or digital techniques or via some networking mechanism of the future.

It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of a particular type of signal bearing media used to actually carry out the distribution. Examples of signal bearing media include: recordable type media such as floppy disks 190, CD-ROMs and transmission type media such as digital and analog communication links.

Figure 2:
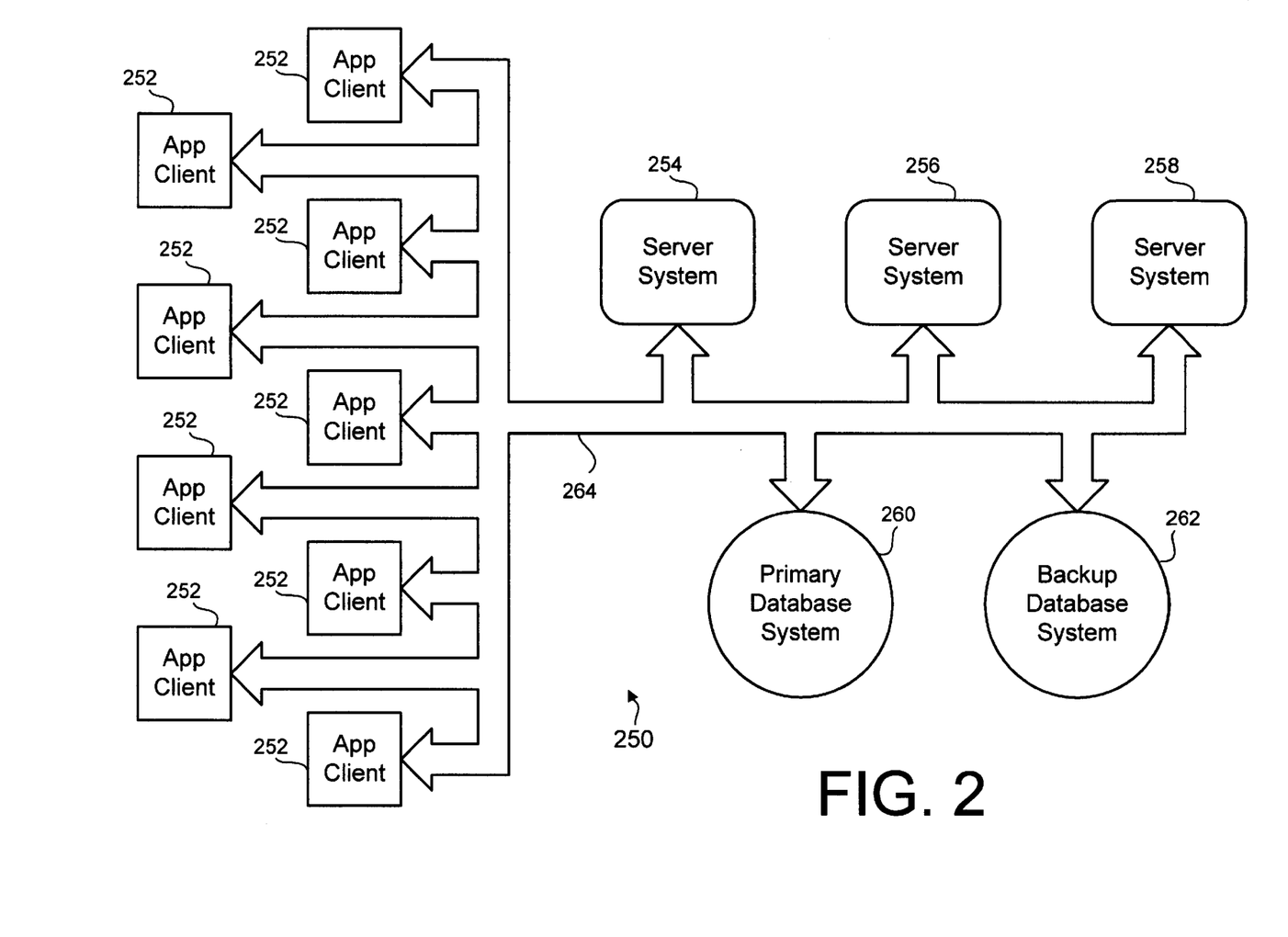
FIG. 2 is a functional block diagram illustrating a three-tier client/server computer system.

Referring now to FIG. 2, the preferred embodiment is implemented in a three-tiered computer system 250. FIG. 2 illustrates a three-tiered computer system having a plurality of application clients 252, three server systems 254, 256, and 258, a primary database system 260 and a backup database system 262 all connected via a bus connection 264.

In three-tiered computer system 250 clients 252 make job requests on server systems 254, 256, and 258. Server systems 254, 256 and 258 are used to process the job requests as requested by the clients 252. These jobs are run using data on primary database system 260 or backup database system 262.

In the preferred embodiment the clients 252 comprise IBM compatible personal computers (PC's) running operating systems such as OS/2 or Windows, but they can also comprise, Network Computers (NC's), Macintosh computers, UNIX computers or other suitable computers. The application servers preferably comprise a high performance server, and are most preferably comprise IBM's AS/400 computers running OS/400. Of course, other systems such as IBM's RS/6000 running AIX, and other UNIX server machines can be used. The primary database system 260 and backup database system 262 preferably comprise a high performance database server system, and most preferably comprise IBM's AS/400 running a relational database such as IBM's DB2. Of course, other database systems such as IBM S/390 mainframe computers can be used as primary database system 260 and backup database system 262.

The clients 252, server systems 254, 256 and 258, primary database system 260 and backup database system 262 are connected using a networking bus communication system 264 such as Ethernet, token ring, ATM, ISDN or others. The clients 252 communicate using a network protocol compatible with the various elements, such as TCP/IP or Opti-Mover.

In most suitable three-tiered computer systems, an interface system is used to control the interaction between applications on the server systems 254, 256 and 258, and the databases on database systems 260 and 262. The interface communicates directly with the individual jobs on the server system and the database system. In particular, the interface establishes connections between jobs running on the server system and the databases, and creates connection handles to identify these connections. When a job is finished, the interface ends the connection between that job and the database.

The preferred embodiment is particularly applicable to SAP AG's R/3 business control application system, but can be used with any other three-tiered computing system.

Figure 3:
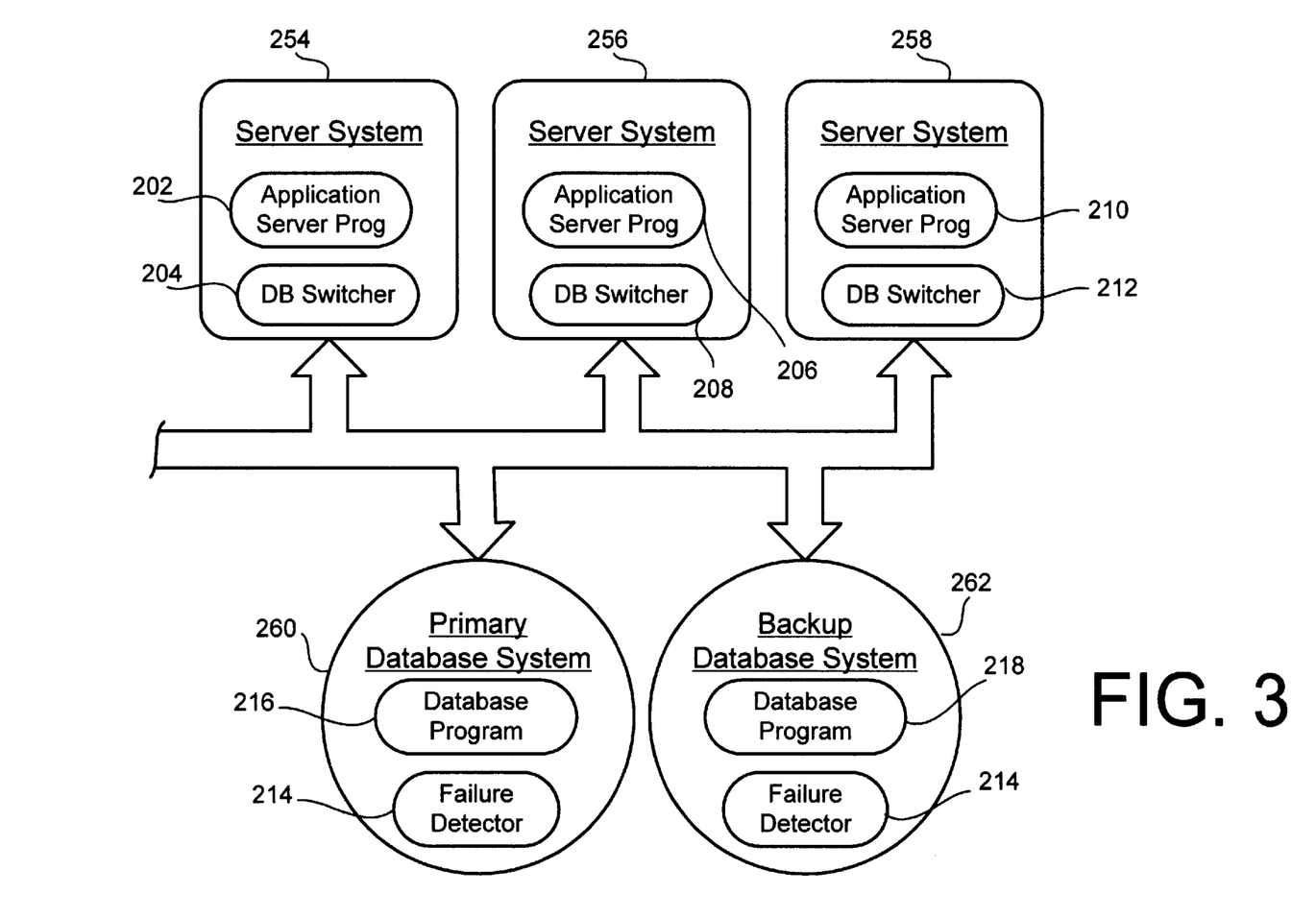
FIG. 3 is a functional block diagram illustrating application servers and databases with a system for switching databases in accordance with the preferred embodiment.

Turning now to FIG. 3, the computer system 250 is illustrated with the server systems including application server programs and database switchers, and with the database systems including database programs and failure detectors in accordance with the preferred embodiment. In particular, the server system 254 includes application server 202 and database switcher 204; server system 256 includes application server 206 and database switcher 208; and server system 258 includes application server 210 and database switcher 212. Additionally, primary database system 260 includes primary database program 216 and a failure detector 214, and backup database system 262 includes backup database program 218 and a failure detector 214. In the preferred embodiment the database switchers 204, 208 and 212 work with failure detectors 214 to provide a system and method for switching between primary database server 216 and backup database server 218 in the event of a database failure without requiring the computer system to be taken down and then restarted.

The failure detector 214 preferably comprises a program that can detect when the primary database 216 is failing or has previously failed. Such a detector can include a database mirroring system such as Lake View Technology's Mimix 400 or Vision Solutions' OMS/400, which in addition to mirroring the primary database server 216 on the backup database server 218, can be used to provide a signal when one of the database servers experiences a failure. Of course, other database mirroring systems that provide this functionality can be used.

The failure detector 214 preferably sends a failure signal to each of the database switchers when an imminent failure is detected. That signal, when received by the database switchers, prompts the database switchers to instruct the application servers to switch to the backup database 216.

Figure 4:
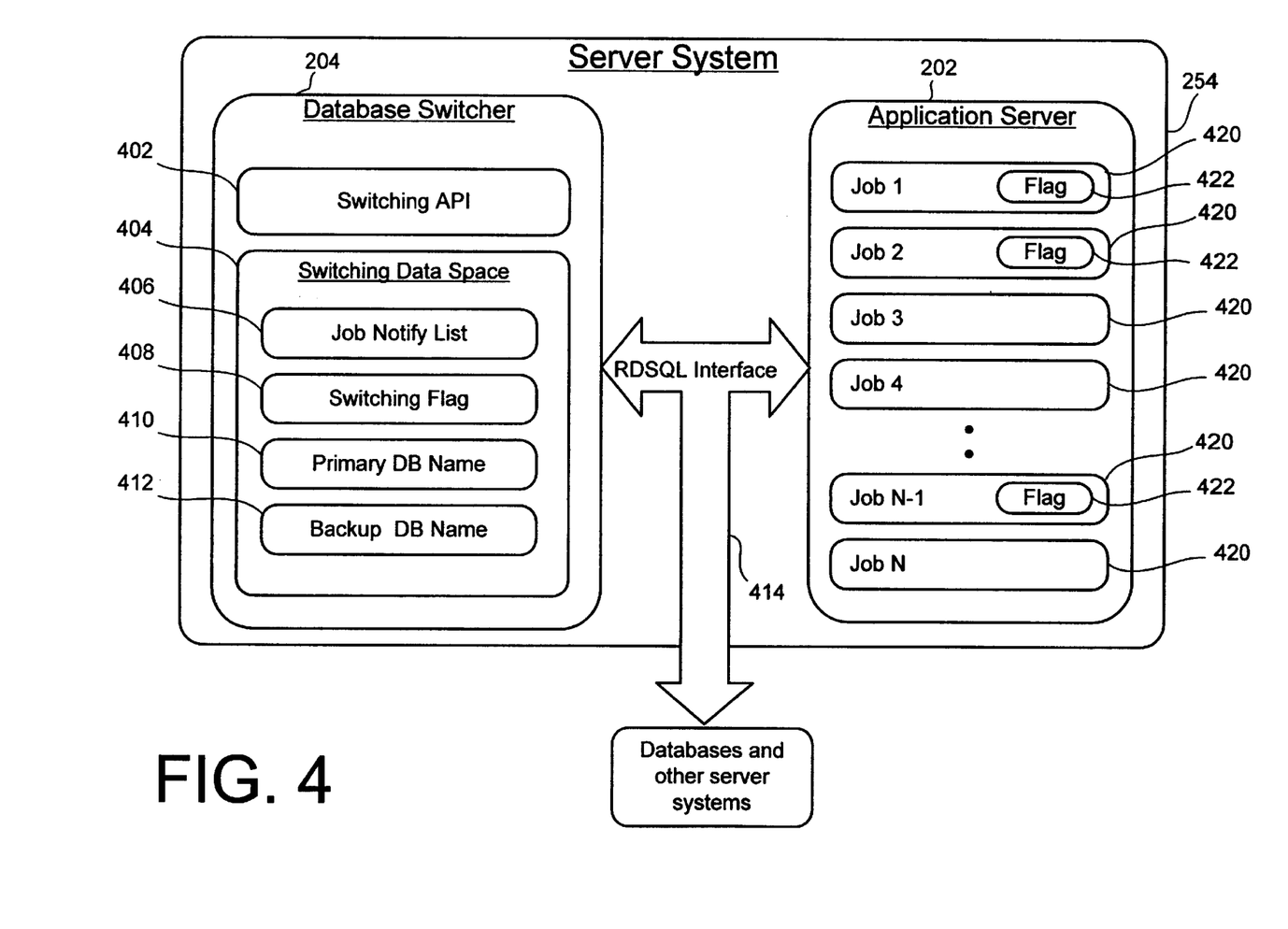
FIG. 4 is a functional block diagram of an application server in accordance with the preferred embodiment.

Turning to FIG. 4, application server 202 and the database switcher 204 of server system 254 are illustrated in more detail to better describe the preferred embodiments. It will be understood that in the preferred embodiment, each of the other application servers and database switchers will be similarly equipped.

Database switcher 204 preferably includes a switching application program interface (API) 402 and a switching data space 404, with switching data space 404 preferably including a job notify list 406, a switching flag 408, primary database name 410 and backup database name 412. Application server 202 includes a plurality of application server jobs 420, with some of the application server jobs including flags 422.

In the preferred system the jobs 420 in application server 202, database switcher 204, databases 216 and 218, and the other jobs and database switchers on other application servers all interact using an interface 414. In particular, interface 414 establishes connections between jobs 420 running on the application server 202 system and the current databases, and creates connection handles to identify these connections. When a job is finished, the interface ends the connection between a job and the database. The details of the preferred interface 414 will be discussed in greater detail below.

In the preferred embodiment, switching data space 404 comprises a set of switching data for each database and its backup that are accessed by the application server 202. Thus, in the illustrated embodiment switching data space 404 is implemented for primary database program 216 and backup database program 218. If the computer system included other primary and backup database programs that were accessed through application server 202, the switching data space 404 would include additional portions implemented in the database switcher 204.

In the preferred embodiment, the switching data space 404 is implemented as a user space object in the AS/400 system, with this user space including job notify list 406, switching flag 408, primary database name 410, and backup database name 412. By implementing data switching space 404 as a user space object the switching data space 404 is easily accessible to more than one job on the system, as long as the name of the user space object is known. Of course, other mechanisms can be used to implement switching data space 404, such as a shared memory space.

The primary database name 410 and the backup database name 412 are stored in the switching database space 404 to identify which jobs are associated with which primary database, and which backup database is associated with which primary database. In particular, each switching data space portion is identified as corresponding to a particular primary database and backup database by the names stored in primary database name 410 and backup database name 412. In the preferred embodiment, the primary database name 410 and the backup database name 412 comprise the system names for the respective systems, but other mechanisms for uniquely identifying the primary and backup databases, such as IP addresses, can be used.

Job notify list 406 includes a list of all jobs 420, stored as process ID's, in application server 202 that are to be notified in the event of a primary database failure. In the preferred embodiment, when a job is initiated on the application server 202 that is compatible with the database switching system of the preferred embodiment, it registers with switching data space 404 and is listed in job notify list 406. When a database failure occurs, a message is sent to each job that is listed in job notify list 406. In this way, only jobs that are capable of switching databases in accordance with the preferred method are notified.

Switching flag 408 is a flag used to alert database switcher 204 that a database switch to the backup database system has occurred. Likewise, flags 422 on the jobs 420 of application server 202 are used to alert the jobs 420 when a database switch to the backup database has occurred. Thus, in the preferred embodiments flags 408 and 422 are set when the application server 202 has switched from the primary database 216 to the backup database 218.

In the preferred embodiment, switching API 402 comprises an externalized program that can be called by other programs in the system to perform various functions depending on the parameter included with the call. In particular, the preferred embodiment switching API 402 can be called to perform six main functions. The first function is a switching function that sets the flags to signify a failing or failed database system. This switching function call preferably includes the current primary database system name and the backup database system name as additional parameters. The switching function on the switching API 402 is suitably called when the failure detector 214 detects an imminent failure in the current database program (i.e., either the primary or backup database which is currently being used).

When the switching function is called, switching API 402 toggles the switching flag 408 in the switching data space 404 corresponding to the specified primary and backup databases. The switching API 402 also sends message to toggle the flags 422 in the jobs listed in job list 406 that are connected to the primary database.

It should be noted that if a switch was already in progress when the failure detector calls the switching function on the switching API, an error code will result and no switch will follow.

A second function performed by the switching API 402 is to record when a switch has been completed and store the new current database and backup database names. This suitably occurs when a switch to the backup database has been completed. In the preferred embodiment, this function is called by the failure detector, which detects when the switch has been made and the backup database system is available. In the preferred embodiment where the failure detector is implemented as part of a database mirror system, the failure detector will know when all the replication to the backup system is completed and the backup system is ready and connected.

A third function performed by switching API cancels a switch to a new database already in progress. This function can be called by the failure detector when it determines that the primary system is still good to use. In some cases the failure detector will prematurely or incorrectly determine that a failure is imminent and order a switch. This function allows the switch to be canceled if the failure detector determines that the database is still functioning properly.

A fourth function is called by an application server job on the switching API 402, causing the switching API 402 to store that job's process ID in the job notify list 406. Likewise, the fifth function is called by application server job on the switching API 402 to remove that job's process ID from job notify list 406.

A sixth function performed by the switching API 402 checks whether a switch for a particular system has occurred. In the preferred embodiment, this is accomplished by the switching API 402 checking the switching flag 408 in the switching data space 404. In the preferred embodiment, switching API is called to check whether a switch has previously been completed before a new job is connected to the database. If the switch has occurred then the name of the backup system that is now the current database is returned, and the job is connected to the backup database instead of the originally specified database.

In the preferred system and method, some of the functionality (e.g., calling functions on the switching API, setting and checking flags, etc.) is performed by the interface 414. Additionally, the interface 414 is used to control the normal interaction between jobs on the server applications and the databases. In the preferred embodiment, the interface 414 comprises a remote dynamic structured query language (RDSQL) interface 414, although other types of interfaces can be used. SQL is a well known standard interactive programming language commonly used for getting information from and updating databases. Dynamic SQL is an known extension of SQL that allows for database queries to be created on the fly, stored and reused.

In the preferred embodiment, a further extension of dynamic SQL is used as the interface. First, the preferred embodiment uses a "remote" dynamic SQL interface (RDSQL), meaning that the dynamic SQL has been extended to allow for data queries between remote computer systems. To facilitate this, an RDSQL interface preferably includes a mechanism to connect and disconnect individual jobs to the appropriate databases. This mechanism would typically create a "connection handle" when a connection between a job and a database is made. This connection handle is then used by the system to direct dynamic SQL queries between the job and the appropriate database. When the transaction between the job and the database is completed and the communication disconnected, the connection handle is inactivated by the RDSQL interface.

Suitably, RDSQL interface 414 on the application server packages a standard SQL query into a form that can be sent to the remote database system and sends it to the database system. At the database system side, the RDSQL interface 414 unpacks the query back into standard SQL form before passing it on to the database. Any results from the query are sent back to the application server in a similar way.

In the preferred embodiment, the RDSQL interface 414 includes a mechanism for toggling flags on the application server jobs when requested by the switching API. Thus, when a switch occurs, the RDSQL interface 414 receives a message from the switching API instructing it to set the job flags 420 for those jobs 420 in the job notify list 408. It should be noted that in this description, to "set" a flag is defined as putting the flag in a condition that indicates a database switch has occurred, and whatever flag state represents a set flag is immaterial. In the preferred embodiment, the RDSQL interface 414 also includes a mechanism for checking the flags on currently connected application server jobs when queries are made to the database. When a new query request for a job comes in, the RDSQL interface 414 will check to see if that job's flag has been set. If a flag has been set, the RDSQL interface 414 will disconnect the job from its current database and connect it with the specified backup database using the connect and disconnect functionality described above.

By having the RDSQL interface 414 set the job flags when requested by the switching API, and then having the RDSQL check the job flags and reconnect to a new database only when a new query request is made, the application server job is allowed to remain in a suspend mode ("sleep") between requests. Handling these functions in the RDSQL interface 414 rather than "waking up" the jobs each time a database switch is made results in better performance because all the jobs will not be disconnecting and reconnecting at the same time.

The RDSQL interface 414 also preferably includes a mechanism to check switching flag 408 on the switching data space 404 when a job first attempts to connect to a database. This is suitably done by calling the appropriate function on the switching API 402. If the flag has not been set, the RDSQL interface 414 connects the job to the specified database. If the flag has been set, the RDSQL interface 414 connects the jobs to the specified backup database.

The RDSQL interface 414 also preferably includes a mechanism for adding jobs to the job notify list 408 in the switching data space 404. This is suitably done by calling the appropriate function on the switching API 402 when a new job capable of being switched is started. Likewise, the RDSQL interface 414 preferably includes a mechanism for removing jobs from the job notify list 408 by calling the appropriate function on the switching API 402.

By having the RDSQL interface 414 communicate with the switching data space 404 (i.e., job notify list 406 and switching flag 408) through the switching API 402, the switching data space 404 is isolated from the RDSQL interface 414. This simplifies administrative work on switching data space 404 such as insuring that it's not being updated by more than one job at a time.

It should be noted that while the preferred embodiment interface comprises a RDSQL interface 414, other mechanisms could be used. For example, a static SQL interface with the functionality discussed above could be used, although this would not allow queries between elements to be created on the fly, and stored and reused.

Figure 5:
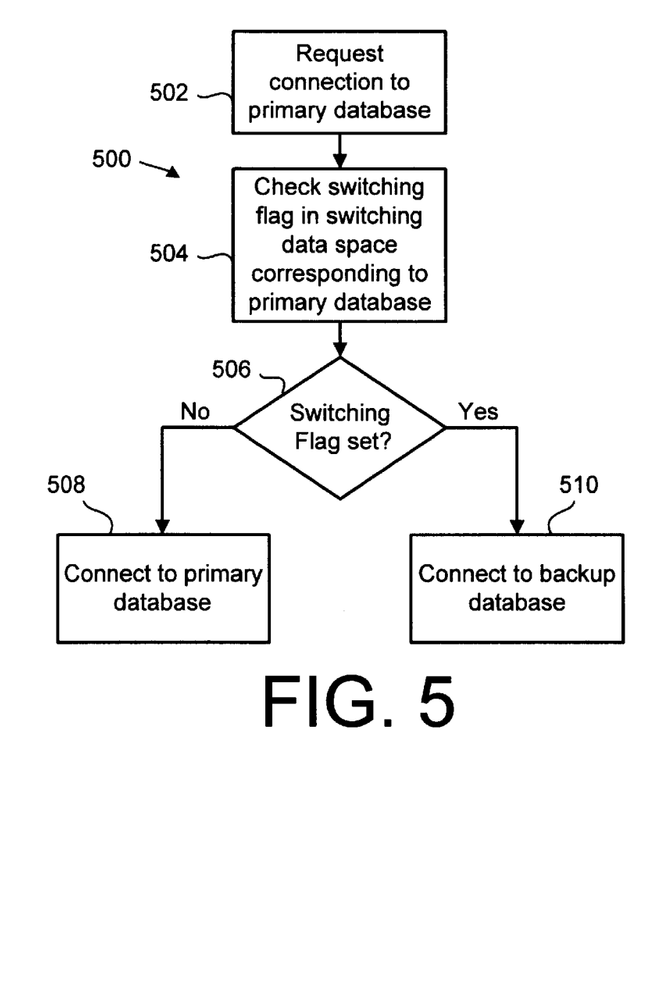
FIG. 5 is a flow diagram illustrating a method for switching new jobs to a backup database in accordance with the preferred embodiment.

A summary of the preferred system operation including the above described switching API 402 and the RDSQL, interface 414 follows. Turning to FIG. 5, a method 500 for switching new jobs to a backup database in accordance with the preferred embodiment is illustrated. The first step 502 occurs when a new job is started. When a new job starts it requests a connection to its specified primary database using the system name of the database. In the next step 504, the switching flag in the switching data space for the specified primary database is checked. In the preferred embodiment, this is done by the RDSQL interface 414 which checks the switching flag 408 corresponding to the specified database in the switching data space 404 by calling the appropriate function on switching API 402. In decision step 506, if the flag has not previously been set, the RDSQL interface 414 connects the new job to the specified primary database (step 508), and creates a connection handle to identify this connection. If the flag has been set, the RDSQL interface 414 connects the new job to the specified backup database (step 510) as supplied by the switching API 402 and creates a connection handle. The RDSQL interface 414 then adds the job's process ID to the job notify list 404 by calling the appropriate function on switching API 402. This entire process is transparent to the job on the application server and any end users.

Figure 6:
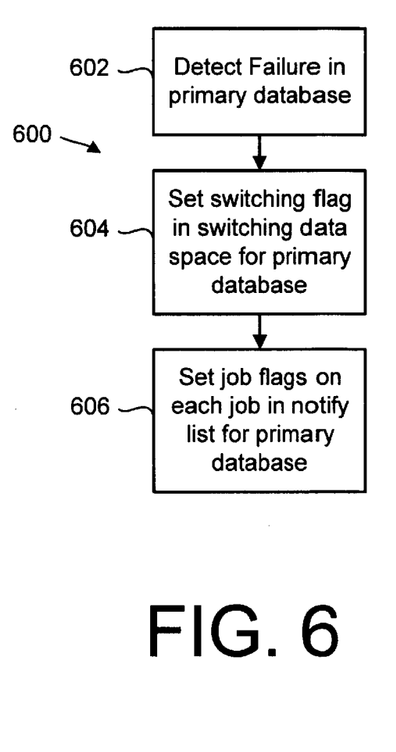
FIG. 6 is a flow diagram illustrating a method in accordance with the preferred embodiment.

Turning to FIG. 6, a method 600 is illustrated that is used during operation when a database failure is detected. In step 602, the failure detector recognizes that the current primary database is experiencing a failure. In step 604 the switching flag in the data space corresponding to the failing database is switched. This flag will then be used when new jobs connect as illustrated in method 500. In step 606 the job flags are set for those jobs that are in the notify list for the failing database. In the preferred embodiment, the steps 604 and 606 are preferred by the failure detector calling the switching function on the switching API 402 with the failing primary database name and its backup database name as parameters. The switching function of the API sets the switching flag 408 in the switching data space 404 corresponding to the specified primary databases. The switching API then instructs the RDSQL interface 414 to set the job flags 420 of all the jobs listed in the job notify list 406 for the specified primary database.

Figure 7:
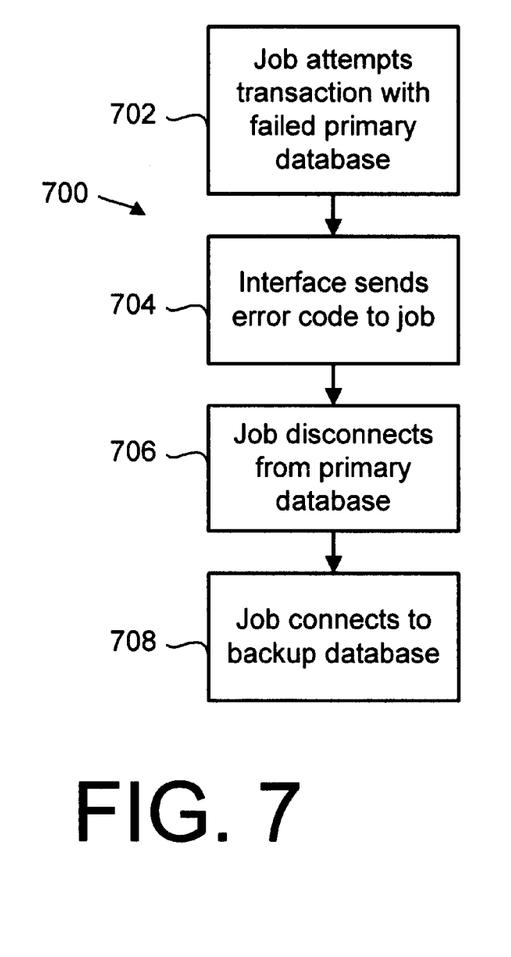
FIG. 7 is a flow diagram illustrating a method for switching currently connected jobs to a backup database in accordance with the preferred embodiment.

Turning now to FIG. 7, a method 700 for switching currently connected jobs to a backup database in accordance with the preferred embodiment is illustrated. When the primary database failed, the job flags 422 on the on the server jobs 420 were set by method 600. In step 702, one of these jobs attempts a transaction with the failed primary database. Because the flag for this job has been set, in step 704, the RDSQL interface 414 will recognize that the current database is no longer available. Thus, when the transaction is attempted, the RDSQL interface 414 will send an error code to the application (step 704). At that time, the application code calls the disconnect function of RDSQL (step 706) followed by the connect function of RDSQL with the primary database specified. The RDSQL interface 414 recognizes that the primary database is offline and connects the job to the backup system (step 708) and creates a connection handle to identify this connection between the job and the backup system.

Thus, both jobs that are currently connected and those that later attempt to connect to a failing primary database are switched to a specified backup database when the switching function is called on the switching API.

In the preferred embodiment, a "switchback" database switch is treated slightly differently than a regular database switch. A switchback occurs when jobs that have previously been switched from the primary database to the backup database are switched back to the original primary database. This typically occurs when the problem that caused the original database failure has been corrected and the primary has been brought back up. A switchback is treated differently than a regular switch for several reasons.

First, it is possible that one particular database system could be acting as a primary database for some jobs, and acting as a backup system for other jobs. This can create problems when the jobs switch from the primary to backup on a system failure, and then are switched back to the primary database.

In particular there is a portion of the switching data space 404 implemented for each primary database system. Thus, there exists in the switching data space 404 a job notify list 406, a switching flag 408, the primary database name 410 and the backup database name 412 for each primary database system. Conversely, there is not a specific switching data space 404 portion for each backup system. Thus, when a database is acting as a backup system, its name is stored in the switching data space 404 for the previous primary database. When the jobs are ready to be switched back, it is desirable to switch only those jobs in which the database is acting as a backup, and not switch those jobs in which the database is acting as a primary. For example, assume that there are two application server jobs 1 and 2, and two databases A and B, with database A acting as a primary for job 1 and a backup for job 2, and with database B acting as a primary for job 2 and as a backup for job 1. If database A fails, job 1 is then switched to use database B. When database A comes back up, job 1 should switch back, but job 2 should remain connected to database B.

If a switchback was treated as a normal switch, all the jobs using the database as a primary database would switch as well as those using it as a backup database. For this reason, when the switching API detects that a switch is a switchback, only those jobs in which the backup database is used as a backup will be switched.

Thus, the preferred database switcher, including a switching API and a switching data space, can be used in conjunction with a failure detector to automatically switch application server jobs from a failing primary database to a backup database. The preferred embodiment also provides the ability to cancel a database switch when needed and also the ability to determine whether a switch has occurred for a given server. The preferred embodiment also provides the ability to selectively add or remove jobs in a notify list such that only selected jobs will be automatically switched in the event of a database failure. It should be noted that the preferred embodiment provides these abilities without requiring intervention by the end user at the server system.

It should be noted that while the preferred embodiment is particularly suitable for use in a three-tiered R/3 installation on an IBM AS/400, that the preferred system and method can be implemented in a wide variety of client server systems. Additionally, while the invention has been particularly shown and described with reference to an exemplary embodiment in an three-tiered system, those skilled in the art will recognize that the preferred embodiments can be applied to various other types of systems, and that various changes in form and details may be made therein without departing from the spirit and scope of the invention.

What is claimed is:

1. An apparatus comprising:
   at least one processor;
   a memory coupled to the at least one processor;
   a computer program residing in the memory, said computer program including a database switcher, said database switcher identifying a selected plurality of jobs that desire to be switched to at least one new database in the event that a failure is detected in at least one current database, said database switcher disconnecting said selected plurality of jobs from the at least one current database and connecting said selected plurality of jobs to the at least one new database while maintaining the processing of said jobs.

2. The apparatus of claim 1 wherein said database switcher includes a list of said selected plurality of jobs that are to be disconnected from said at least one current database and connected to said at least one new database.

3. The apparatus of claim 1 wherein database switcher includes at least one switching flag, said at least one switching flag corresponding to said at least one current database and causing new jobs to connect to said at least one new database instead of said at least one current database.

4. The apparatus of claim 1 wherein database switcher includes a switching data space comprising a set of switching data for each of the at least one current database and corresponding at least one backup database that are accessed by the selected plurality of jobs.

5. The apparatus of claim 4 wherein each of said data sets includes a list of said selected plurality of jobs that are to be disconnected from a corresponding one of said at least one current database and connected to a corresponding one of said at least one new database.

6. The apparatus of claim 1 wherein said database switcher includes a switching API, said switching API including a function to set a plurality of flags associated with said plurality of jobs, and wherein each of said plurality of flags causes said each associated job to disconnect from said at least one current database and connect to said at least one new database when a database request is performed.

7. The apparatus of claim 6 wherein said switching API further includes a mechanism to determine if said plurality of jobs have disconnected from said at least one current database and reconnected to said at least one new database.

8. The apparatus of claim 7 wherein said switching API further includes a mechanism to add jobs to a job notify list.

9. The apparatus of claim 8 wherein said switching API further includes a mechanism to remove jobs from said job notify list.

10. A method for automatically switching an application server job from a current database to a backup database when a database failure occurs, the method comprising the steps of:
 a) identifying that said application server job desires to be switched to said backup database in the event that a failure is detected in said current database;
 b) detecting a failure in said current database;
 c) disconnecting said application server job from said current database when said application server job attempts to access said current database; and
 d) automatically connecting said application server job to said backup database.

11. The method of claim 10 further comprising the step of setting a job flag.

12. The method of claim 11 wherein the step of setting a job flag comprises setting job flags for jobs contained in a job notify list.

13. The method of claim 11 further comprising the step of setting a switching flag in a switching data space.

14. The method of claim 13 further comprising the step of checking said switching flag when a new job attempts to connect to said current database, and wherein said new job is connected to said current database if said switching flag is not set and said new job is connected to said backup database if said switching flag is set.

15. A program product comprising:
 (A) a database switcher, said database switcher identifying a selected plurality of jobs that desire to be switched to at least one new database in the event that a failure is detected in at least one current database, said database switcher disconnecting said selected plurality of jobs from the at least one current database and connecting said selected plurality of jobs to the at least one new database while maintaining the processing of said jobs; and
 (B) signal bearing media bearing said database switcher.

16. The program product of claim 15 wherein the signal bearing media comprises recordable media.

17. The program product of claim 15 wherein the signal bearing media comprises transmission media.

18. The program product of claim 15 wherein said database switcher includes a list of said selected plurality of jobs that are to be disconnected from said at least one current database and connected to said at least one new database.

19. The program product of claim 15 wherein said database switcher includes at least one switching flag, said at least one switching flag corresponding to said at least one current database and causing new jobs to connect to said at least one new database instead of said at least one current database.

20. The program product of claim 15 wherein said database switcher includes a switching data space, and wherein said switching data space includes a set of switching data for each of the at least one current database and corresponding at least one backup database that are accessed by the selected plurality of jobs.

21. The program product of claim 20 wherein each of said data sets in said switching data space includes a list of said selected plurality of jobs that are to be disconnected from a corresponding one of said at least one current database and connected to a corresponding one of said at least one new databases.

22. The program product of claim 15 wherein said database switcher include s a switching API, and wherein said switching API includes a function to set a plurality of flags associated with said plurality of jobs, and wherein each of said plurality of flags causes said each associated job to disconnect from said at least one current database and connect to said at least one new database when a database request is performed.

23. The program product of claim 22 wherein said switching API further includes a mechanism to determine if said plurality of jobs have switched from said at least one current database to said at least one new database.

24. The program product of claim 22 wherein said switching API further includes a mechanism to add jobs to a job notify list.

25. The program product of claim 22 wherein said switching API further includes a mechanism to remove jobs from said job notify list.

26. An apparatus comprising:
 at least one processor;
 a memory coupled to the at least one processor
 a) a switching data space residing in said memory, said switching data space including:
  i) a list of selected jobs, the list of selected jobs identifying jobs that desire to be disconnected form a current database and reconnected to a backup database in the event of a failure in said current database, the list of selected jobs including the process ID of the selected jobs;
 b) a switching API residing in said memory, said switching API including:
  i) a mechanism for directing a plurality of flags corresponding to said plurality of jobs to be set;
 c) an interface residing in said memory, said interface providing interaction between said plurality of jobs and said current database and said backup database, said interface including:
  i) a mechanism for setting said plurality of flags on corresponding to said plurality of jobs when directed by said switching API.

27. The apparatus of claim 26 wherein:
said switching data space further includes:
   ii) a switching flag, said switching flag directing new jobs to connect with a backup database when said switching flag is set;
and wherein said switching API further includes:
   ii) a mechanism for setting said switching flag.

28. The apparatus of claim 27 further comprising a failure detector, said failure detector detecting a failure in said current database and calling said switching API mechanism for setting said switching flag and said switching API mechanism for directing said plurality of flags corresponding to said plurality of jobs to be set.

29. The apparatus of claim 26 wherein said interface further comprises:
   i) a mechanism for connecting a job with a database; and
   ii) a mechanism for disconnecting a job from a database.

30. The apparatus of claim 29 wherein said interface disconnects one of said plurality of jobs from said current database and reconnects said one of said plurality of jobs to said backup database when said interface detects that said flag corresponding to said one of said plurality of jobs has been set.

31. The apparatus of claim 30 wherein said interface detects that said flag corresponding to said one of said plurality of jobs has been set when said one of said plurality of jobs attempts to query said current database.

32. The apparatus of claim 26 further comprising a failure detector, said failure detector detecting a failure in said current database and calling said switching API mechanism for directing said plurality of flags corresponding to said plurality of jobs to be set.

33. The apparatus of claim 26 wherein:
said switching data space further includes:
   ii) a switching flag;
and wherein said switching API further includes:
   ii) a mechanism for setting said switching flag;
   iii) a mechanism for checking if said switching flag has been set;
and wherein said interface further comprises:
   ii) a mechanism for connecting a job with a database; and
wherein said interface calls said mechanism for checking if said switching flag has been set when a new job attempts to connect to said current database, and wherein said interface connects said new job to said current database if said switching flag has not been set and connects said new job to said backup database if said switching flag has been set.

34. A method for automatically switching a plurality of jobs from a current database to a backup database, the method comprising the steps of:
a) setting a switching flag in a switching data space;
b) setting a plurality of job flags, the plurality of job flags identifying a plurality of selected jobs that desire to be switched to said backup database in the event that a failure is detected in said current database;
c) disconnecting each of said plurality of jobs having a job flag set from said current database;
d) reconnecting each of said plurality of jobs having a job flag set to said backup database; and
e) checking said data switching flag when a new job attempts to connect to said current database, and wherein said new job is connected to said current database if said switching flag is not set and said new job is connected to said backup database if said switching flag is set.

35. The method of claim 34 wherein the step of setting a switching flag comprises calling a switching function on a switching API.

36. The method of claim 34 wherein the step of setting a plurality of job flags comprises setting a plurality of job flags corresponding to a plurality of jobs in a job notify list contained in a switching data space.

37. The method of claim 36 wherein the step of setting a plurality of job flags comprises calling said switching function on a switching API.

38. The method of claim 34 wherein the step of disconnecting each of said plurality of jobs having a job flag set from said current database is performed when said plurality of jobs having a job flag set attempts to access said current database.

39. An apparatus comprising:
at least one processor;
a memory coupled to the at least one processor;
a database switcher in said memory, said database switcher including:
   a) a switching data space portion corresponding to a first current database, said switching data pace portion including:
      i) a list of selected jobs, the list of selected jobs identifying jobs that desire to be notified in the event of a switch from said first current database to a backup database, the list of jobs including the process ID of the selected jobs;
      ii) a switching flag, said switching flag directing new jobs to connect with a backup database when said switching flag is set;
      iii) a system name for said first current database;
      iv) a system name for said backup database;
   b) a switching API in said memory, said switching API including:
      i) a mechanism for setting said switching flag when said first current database is unavailable;
      ii) a mechanism for directing a plurality of flags corresponding to said plurality of jobs to be set;
      iii) a mechanism for adding a new jobs to said list of jobs when said new job is connected to said first current database;
      iv) a mechanism for removing a completed job from said list of jobs;
      v) a mechanism for determining if a switch has occurred from said first current database to said backup database;
   c) a remote dynamic structured query language (RDSQL) interface in said memory, said RDSQL interface including:
      i) a mechanism for connecting a job with a database;
      ii) a mechanism for passing query requests from said plurality of jobs to a database;
      iii) a mechanism for disconnecting a job from a database;
      iv) a mechanism for setting said flags on said plurality of jobs when directed by said switching API; and
a failure detector, said failure detector detecting a failure in said first current database and calling said switching API mechanism for setting said switching flag and said mechanism for directing a plurality of flags corresponding to said plurality of jobs to be set.

40. A method for automatically switching a plurality of jobs from a current database to a backup database, the method comprising the steps of:

a) identifying a plurality of jobs that desire to be switched to the backup database in the event that a failure is detected in the current database, said plurality of jobs listed in a job notify list;

b) detecting a failure in said current database;

c) setting a switching flag in a switching data space portion corresponding to said current database, said step of setting a switching flag performed by calling a switching function on a switching API;

d) setting a plurality of job flags corresponding to a plurality of jobs in the job notify list contained in said switching data space portion, said step of setting a plurality of job flags performed by calling said switching function on said switching API;

e) disconnecting each of said plurality of jobs having a job flag set from said current database when said job having a job flag set attempts to access said current database;

f) reconnecting each of said plurality of jobs having a job flag set to said backup database; and g) checking said data switching flag when a new job attempts to connect to said current database, and wherein said new job is connected to said current database if said switching flag is not set and said new job is connected to said backup database if said switching flag is set.

* * * * *